Sept. 5, 1939.  E. M. BURKE  2,171,681
PIPE CONNECTION
Filed Nov. 19, 1938  2 Sheets-Sheet 2
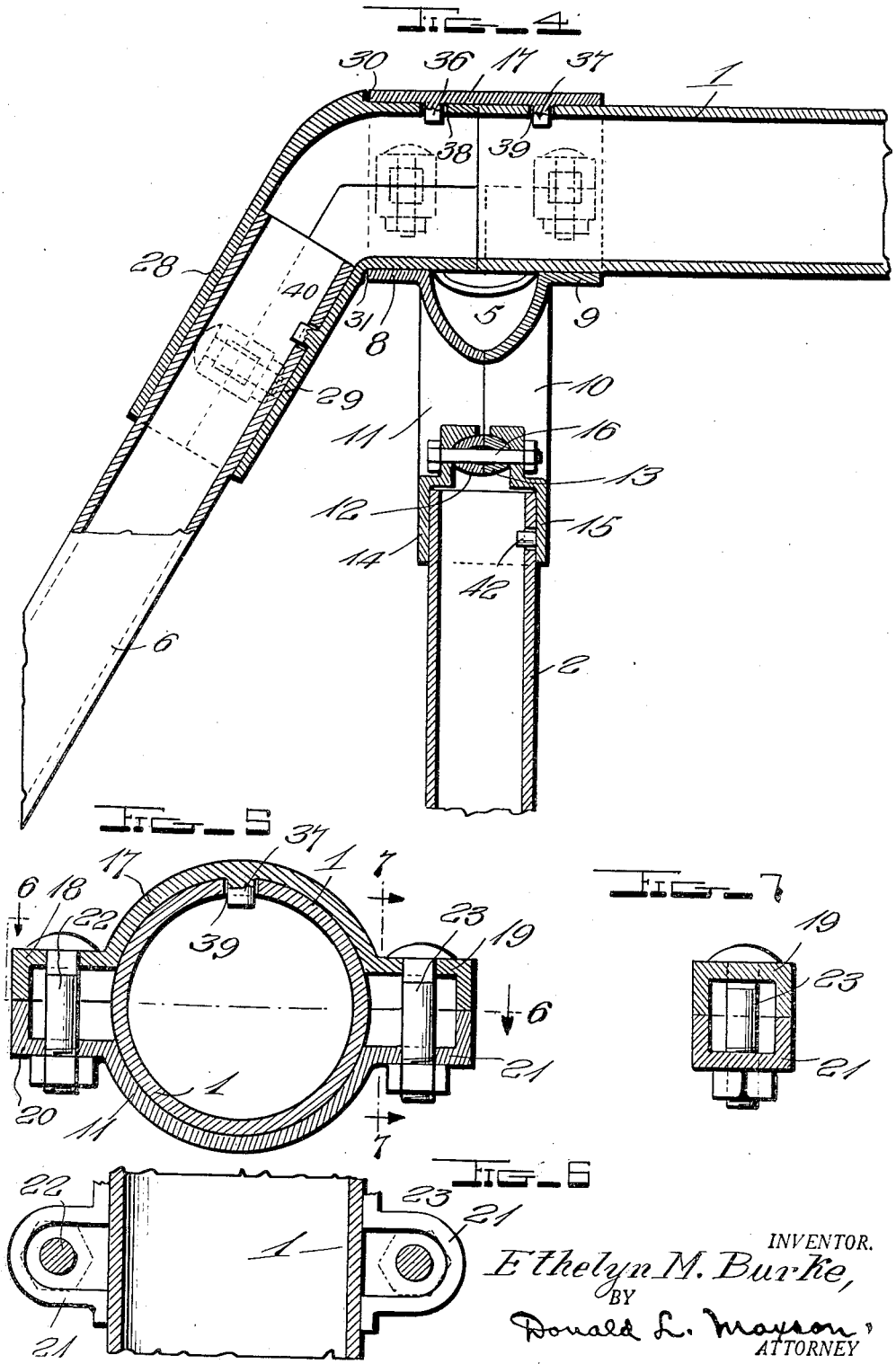

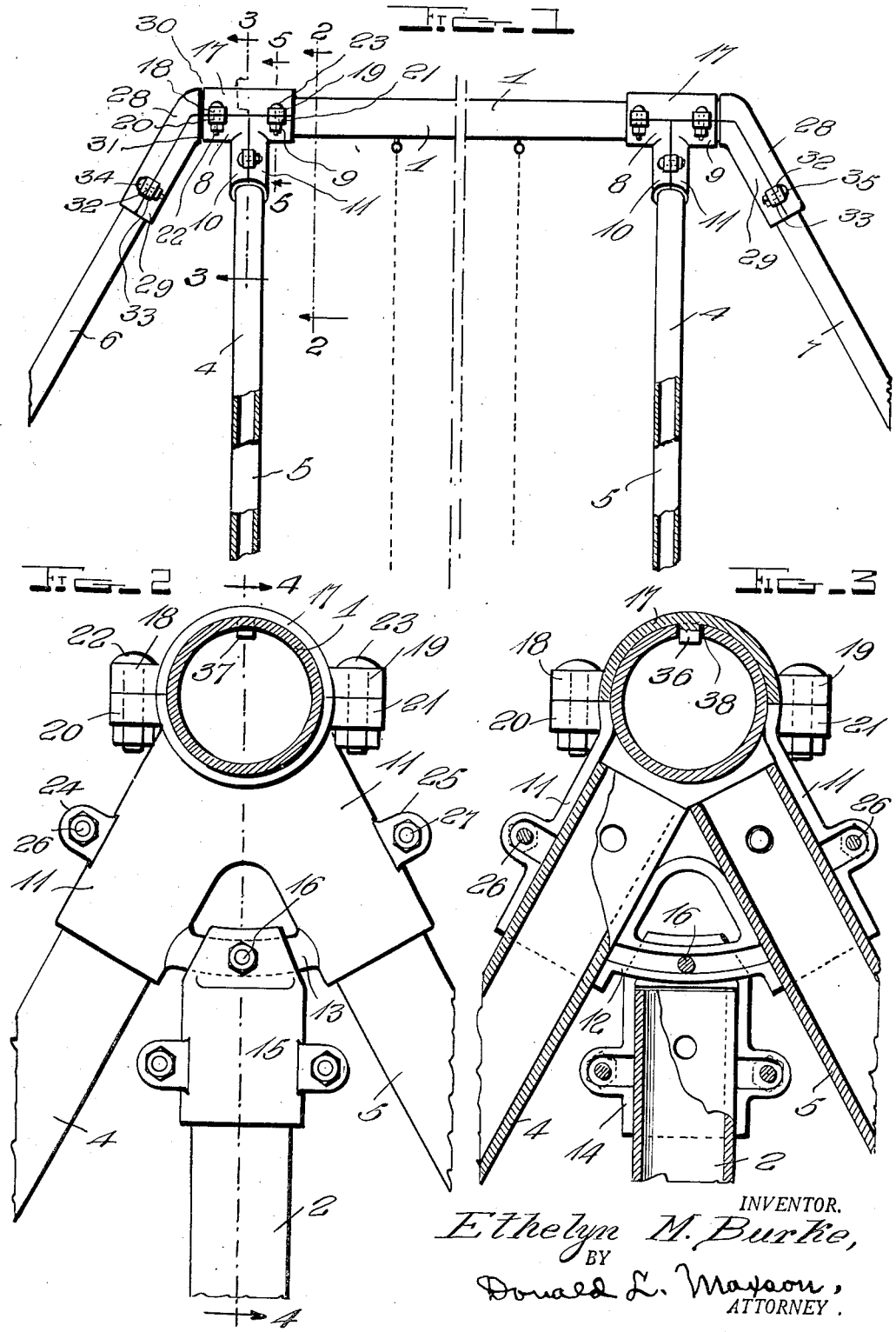

Patented Sept. 5, 1939

2,171,681

UNITED STATES PATENT OFFICE 2,171,681

PIPE CONNECTION

Ethelyn M. Burke, Fond du Lac, Wis.

Application November 19, 1938, Serial No. 241,442

3 Claims. (Cl. 287—54)

My invention relates to improvements in pipe fittings or connections, and more particularly to a connection for the end of a horizontal pipe support, usually provided for the support for playground swings and the like.

An object of my invention is to provide an improved end pipe fitting or support connection for supporting the end of a horizontal pipe to which playground swings or the like may be suspended, and said connection also providing positive means for securement to angularly arranged vertical, lateral and endwise supporting and bracing pipes.

Another object of my invention is to provide an improved end bearing and supporting connection for a horizontal support, incorporating split cooperating sections having means for clamping the same to cooperating supporting and bracing pipes, and the further addition of inwardly extending positioning and locking studs carried by the connection for being received in opening formed in the several supporting and bracing pipes.

A still further object of my invention is to provide an improved composite or sectional split end pipe fitting or connection for supporting a horizontal supporting pipe and its bracing and supporting pipes, which will be highly efficient in operation, and quite inexpensive to manufacture and produce.

Other objects will appear as the description proceeds.

In the accompanying drawings which form a part of my application,

Figure 1 is a side elevation of a horizontal playground swing support showing my invention incorporated therein;

Figure 2 is a sectional view taken on the line 2—2 of Figure 1;

Figure 3 is a sectional view taken on the line 3—3 of Figure 1;

Figure 4 is a sectional view taken on the line 4—4 of Figure 2;

Figure 5 is a sectional view taken on the line 5—5 of Figure 1;

Figure 6 is a sectional view taken on the line 6—6 of Figure 5, and

Figure 7 is a sectional view taken on the line 7—7 of Figure 5.

Like characters of reference are used throughout the following specification and the accompanying drawings which form a part of my application.

In carrying out my invention, it will be understood that my invention comprises an end connection or pipe fitting which will be secured at each end of a horizontal pipe for supporting playground swings or other suspended playground apparatus, and will provide means for attaching the connections to vertical supporting bars or pipes, and also to angularly disposed laterally and endwise extending bracing bars or pipes.

The connection will comprise a formation made from seven cooperating semi-cylindrical elongated pipe sections, each section being provided with oppositely disposed laterally extending perforated locking lugs or ears, which cooperate with similarly formed locking ears or lugs on the cooperating pipe sections, and which are adapted to receive locking bolts for holding the several sections in assembled position. Also, several of the sections are provided with inwardly directed, integrally formed locking studs, which are adapted to be received either within locking openings on the other sections, or in the cooperating supporting and bracing bars or pipes, the whole assembly providing for the positive support of a horizontal supporting bar or pipe, vertically disposed supporting braces, oppositely disposed laterally extending bracing pipes, and outwardly and downwardly extending bracing pipes at the opposite ends of the horizontal supporting bar or pipe.

By referring to the drawings, I designate the main or horizontal supporting bar or pipe by the numeral 1, the vertical supporting braces by the reference numerals 2 and 3, respectively, the lateral downwardly and outwardly extending braces by the numerals 4 and 5, and the end outwardly and downwardly extending braces by the numerals 6 and 7.

The base clamping members 8 and 9 are adapted to lie adjacent each other and to support the end of the bar or pipe 1, each of said members being provided with laterally and downwardly extending clamping sections 10 and 11 for the reception of the bracing pipes 4 and 5. The sections 10 and 11 are further tied together by means of the integrally formed cooperating bracing ties 12 and 13, arranged adjacent the lower ends of the said sections 10 and 11. Cooperating clamping sections 14 and 15 having reduced upper ends are provided for securing to the vertical supporting pipes or braces 2 and 3, said reduced ends being adapted to fit around the cross bracing ties 12 and 13, and to be secured thereto by means of the bolt 16, which extends through said ends and ties.

A cap member 17 is provided for cooperation with the base clamping members 8 and 9, and is adapted to fit over the upper surface of the end of the bar or pipe 1, while spaced perforated ears or lugs 18 and 19 cooperate with the lugs 20 and 21 formed on the sections 8 and 9, and to be secured togther by means of the bolts 22 and 23.

The clamping sections 10 and 11 are further provided with cooperating perforated locking ears or lugs 24 and 25, and are adapted to receive the locking bolts 26 and 27 for securing them in fixed position.

The end brace supporting members comprise cooperating sections 28 and 29, which are bent and reduced at their upper ends to fit into or seat within the adjacent end of the base and cap members, the shoulders 30 and 31 on the sections 28 and 29 engaging and seating on the said ends of the base and cap members. Cooperating perforated ears or lugs 32 and 33 are formed on the sections 28 and 29, and are held in assembled position by means of the bolts 34 and 35, which are positioned through the said ears or lugs.

A pair of inwardly directed integrally formed locking studs 36 and 37 are formed on the cap member and are adapted to be received within corresponding openings 38 and 39, formed in end brace 28 and the bar or pipe 1, respectively. Locking studs 40 and 41 are provided respectively in the section 29 and the sections 10 and 11 for positioning in openings or sockets formed in the end bracing pipes 6 and 7, and in the laterally extending bracing pipes 4 and 5. Similar lug 42 is formed in the clamping section 15 for cooperation with an opening or socket formed in the vertical supporting pipes 2 and 3.

From the foregoing description, it will be apparent that a plurality of cooperating split clamps are provided held together by means of the lugs or ears and bolts, and further secured to the several bars and braces by means of the locking studs and cooperating sockets. The connection provided affords the full equivalent of a single casting having a plurality of locking means, but in fact, made from seven separate cooperating sections, which interlock in such a manner to produce a highly efficient fitting.

Many minor changes in detail of construction may be resorted to without departure from the spirit of the invention.

Having thus described my invention what I claim as new and desire to secure by Letters Patent of the United States is:

1. A pipe connection comprising a plurality of interlocking parts consisting of a pair of base clamping members having integrally formed angularly disposed depending brace clamping sections interconnected adjacent their outer extremities, cooperating clamping sections having reduced ends clamped about the interconnecting portions of said brace clamping sections and having a locking bolt extending through said reduced ends and said interconnecting portions, a cap member secured to said base clamping members, and cooperating end brace clamping members interlocked to said base clamping members and cap member.

2. The subject matter as claimed in claim 1, and laterally extending clamping lugs on all of said members and sections formed with registering openings, and bolts extending through said openings for holding said connection in assembled relation.

3. The subject matter as claimed in claim 1, laterally extending clamping lugs on all of said members and sections formed with registering openings, bolts extending through said openings for holding said connection in assembled relation, and inwardly extending locking and positioning studs formed integrally on the inner surfaces of said members and sections for locking reception in openings formed in the pipes connected to said connection.

ETHELYN M. BURKE.